(12) United States Patent
Kurokawa

(10) Patent No.: US 8,427,701 B2
(45) Date of Patent: Apr. 23, 2013

(54) IMAGE ARRANGEMENT SUPPORTING DEVICE, IMAGE PROCESSOR, IMAGE ARRANGEMENT SUPPORTING METHOD AND COMPUTER READABLE MEDIUM

(75) Inventor: Kazunori Kurokawa, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 441 days.

(21) Appl. No.: 12/781,331

(22) Filed: May 17, 2010

(65) Prior Publication Data

US 2011/0080601 A1    Apr. 7, 2011

(30) Foreign Application Priority Data

Oct. 6, 2009   (JP) .................................. 2009-232578

(51) Int. Cl.
*G06F 15/00*    (2006.01)
*G03F 3/08*    (2006.01)

(52) U.S. Cl.
USPC ........................... 358/1.9; 358/1.18; 358/518

(58) Field of Classification Search ................... 358/1.9, 358/1.18, 3.06, 3.23, 518, 523; 382/284, 382/289, 291, 294, 298
See application file for complete search history.

(56) References Cited

U.S. PATENT DOCUMENTS

| | | | |
|---|---|---|---|
| 6,868,189 B1* | 3/2005 | Hoshino | 382/260 |
| 6,870,637 B1* | 3/2005 | Watanabe | 358/1.9 |
| 7,177,045 B2* | 2/2007 | Goel et al. | 358/1.18 |
| 2009/0086265 A1* | 4/2009 | Toda et al. | 358/1.15 |

FOREIGN PATENT DOCUMENTS

JP    A-2001-136364    5/2001

* cited by examiner

*Primary Examiner* — Charlotte M Baker
(74) *Attorney, Agent, or Firm* — Oliff & Berridge, PLC

(57) ABSTRACT

An image arrangement supporting device includes: a detection unit that detects a state in which plural images associated with drawing attributions different from each other are arranged on one virtual medium; and an output unit that outputs information indicating that at least one of the plural images is not formed on one real medium with a drawing attribution associated with the at least one of the plural images, in accordance with detection of the state by the detection unit.

10 Claims, 10 Drawing Sheets

IMAGE ARRANGEMENT SUPPORTING DEVICE, IMAGE PROCESSOR, IMAGE ARRANGEMENT SUPPORTING METHOD AND COMPUTER READABLE MEDIUM

CROSS REFERENCE TO RELATED APPLICATIONS

This application is based on and claims priority under 35 USC §119 from Japanese Patent Application No. 2009-232578 filed Oct. 6, 2009.

BACKGROUND

1. Technical Field

The present invention relates to an image arrangement supporting device, an image processor, an image arrangement supporting method and a computer readable medium storing a program.

2. Related Art

There is known a technique to display a preview with a layout after book binding for book binding and printing.

SUMMARY

According to an aspect of the present invention, there is provided an image arrangement supporting device including: a detection unit that detects a state in which plural images associated with drawing attributions different from each other are arranged on one virtual medium; and an output unit that outputs information indicating that at least one of the plural images is not formed on one real medium with a drawing attribution associated with the at least one of the plural images, in accordance with detection of the state by the detection unit.

BRIEF DESCRIPTION OF THE DRAWINGS

Exemplary embodiment(s) of the present invention will be described in detail based on the following figures, wherein.

DETAILED DESCRIPTION

An exemplary embodiment of the present invention will be described below in detail with reference to the accompanying drawings.

Figure 1:
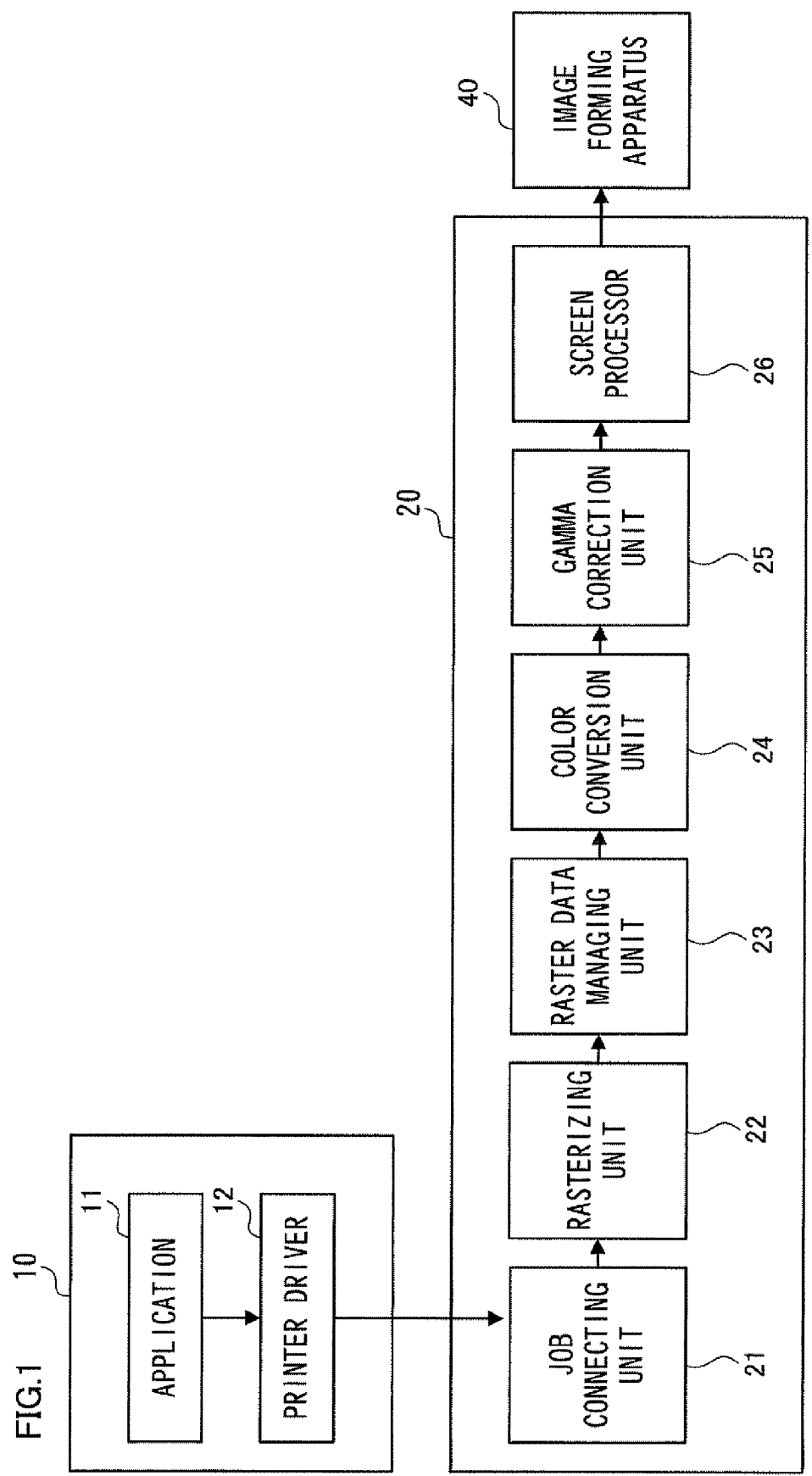
FIG. 1 is a diagram showing a configuration example of a computer system to which the exemplary embodiment of the present invention is applied.

FIG. 1 is a diagram showing a configuration example of a computer system to which the exemplary embodiment of the present invention is applied.

As shown in FIG. 1, the computer system includes a host device 10, an image processor 20 and an image forming apparatus 40.

The host device 10 is a device to provide image data that is a source of an image to be formed on a recording medium such as paper. The host device 10 includes at least an application program (hereinafter, simply referred to as "application") 11 and a printer driver 12. The host device 10 is implemented by a personal computer (PC), for example.

The application 11 is document processing software, spread sheet software or the like. The application 11 outputs to the printer driver 12 a command to require printing of data having been made.

The printer driver 12 receives this command and generates a print job in which a drawing attribution is set to data in page description language (PDL), which is a drawing command for a printer. The drawing attribution herein is attribute data used for drawing, such as a color correction parameter used for color conversion, a gradation correction parameter used for gradation conversion, and the like.

The image processor 20 is a device that performs image processing on image data provided by the host device 10. The image processor 20 includes a job connecting unit 21, a rasterizing unit 22, a raster data managing unit 23, a color conversion unit 24, a gamma correction unit 25 and a screen processor 26. The image processor 20 is implemented inside of a printer, for example.

The job connecting unit 21 connects plural print jobs transmitted from the host device 10 with each other, according to a request of a user, thereby to generate one print job. If there is no request, of a user, to connect plural print jobs, the job connecting unit 21 delivers the plural print jobs to the subsequent unit as they are. In the present exemplary embodiment, a print job is used as an example of a drawing command, and the job connecting unit 21 is provided as an example of an acquisition unit that acquires the drawing command.

The rasterizing unit 22 receives the print job connected by the job connecting unit 21, interprets PDL data included in the print job, and performs raster processing to generate raster data. On this occasion, an RGB color signal included in the PDL data is converted into a CMYK color signal. In addition, the drawing attribution having been set to each print job prior to the connection is successively set to the raster data generated on the basis of each print job. In the present exemplary embodiment, the rasterizing unit 22 is provided as an example of a generation unit that generates an image on the basis of the drawing command.

The raster data managing unit 23 manages the raster data generated by the rasterizing unit 22, in association with drawing attributions.

The color conversion unit 24 converts a CMYK color signal representing color of each pixel for the raster data managed by the raster data managing unit 23 into a CMYK color signal corresponding to the characteristics of the image forming apparatus 40.

The gamma correction unit 25 performs the gamma correction for each color signal of C, M, Y and K.

The screen processor 26 performs screen processing (binarization processing), with a dither pattern, on CMYK color signals (multi-valued color signals) on which the gamma correction having been performed by the gamma correction unit 25. The screen processor 26 then outputs to the image forming apparatus 40 the color signals (binary color signals) subjected to the screen processing.

In the present exemplary embodiment, the color conversion unit 24, the gamma correction unit 25 and the screen processor 26 are provided as an example of a drawing unit that draws an image with a drawing attribution.

The image forming apparatus 40 is an apparatus that forms an image on a recording medium such as paper by use of toners corresponding to the respective color signals after the screen processing. The image forming apparatus 40 may employ one of the following two methods: an electrophotographic method in which an image is formed by transferring toner attached to a photoconductive drum onto a recording medium; and an ink jet method in which an image is formed by ejecting ink onto a recording medium.

In such an image processor 20, a thumbnail image may be displayed based on the raster data managed by the raster data managing unit 23, and processing (hereinafter, referred to as "imposition") may be performed in which an image of an original document (hereinafter, referred to as "original image") generated by the host device 10 is laid out in one page of a sheet by operating the thumbnail image, for example.

On this occasion, plural original images generated on the basis of print jobs to which different drawing attributions have been set may be imposed in one page of a sheet, in such an image processor 20, which has a function to connect plural print jobs.

In such a case, for some types of drawing attribution, a problem occurs if plural original images generated on the basis of print jobs to which different drawing attributions have been set are arranged in the same page. Listed as examples of types of such a drawing attribution are a color mode, a CMYK color correction parameter (hereinafter, simply referred to as "color correction parameter"), a tone curve adjustment parameter and a screen specification parameter. A reason why a problem occurs is as follows. As for a color mode, charges for printing are influenced if a color part and a monochrome part are mixed in one page of a sheet. As for a color correction parameter, the parameter for a type of sheet to be printed is designated. As for a tone curve adjustment parameter and a screen specification parameter, adjustment for the whole page is needed. For these types of drawing attribution, if plural original images generated on the basis of print jobs to which different drawing attributions have been set are arranged in the same page, any one of the drawing attributions is employed. Then, for some original images, an outputted result may be different from one obtained by printing without imposition.

In this case, there is no serious problem for a drawing attribution, such as a color mode, for example, being visually recognizable with a thumbnail image, because it is known in advance that an unintended outputted result would be obtained. However, in a case where original images to which color correction parameters for different types of sheet have been set are imposed in the same page, the color correction parameters are changed to the same one, which makes confirmation on a display difficult.

Thus, in the present exemplary embodiment, it is detected that original images having different drawing attributions are arranged in one page of a sheet. Then, a preview of such a page is displayed and designated, thereby to address the problem of competitive drawing attributions on the page. Specifically, at least one of the plural drawing attributions competing with each other is allowed to be changed.

On this occasion, a type of drawing attribution to be changed is allowed to be designated from plural types of drawing attribution registered in advance. For example, a color mode is a type of drawing attribution that is distinguishable by seeing a preview, and thus is not registered as a type of drawing attribution to be changed.

Meanwhile, for some types of drawing attribution, a difference between outputted results is not distinguishable even if there is a slight difference. Thus, for such a type of drawing attribution, drawing attributions are regarded to be different from each other, only if the difference is more than a degree of allowance set in advance.

An outline of such an operation will be described below with reference to FIGS. 2 to 5.

Figure 2:
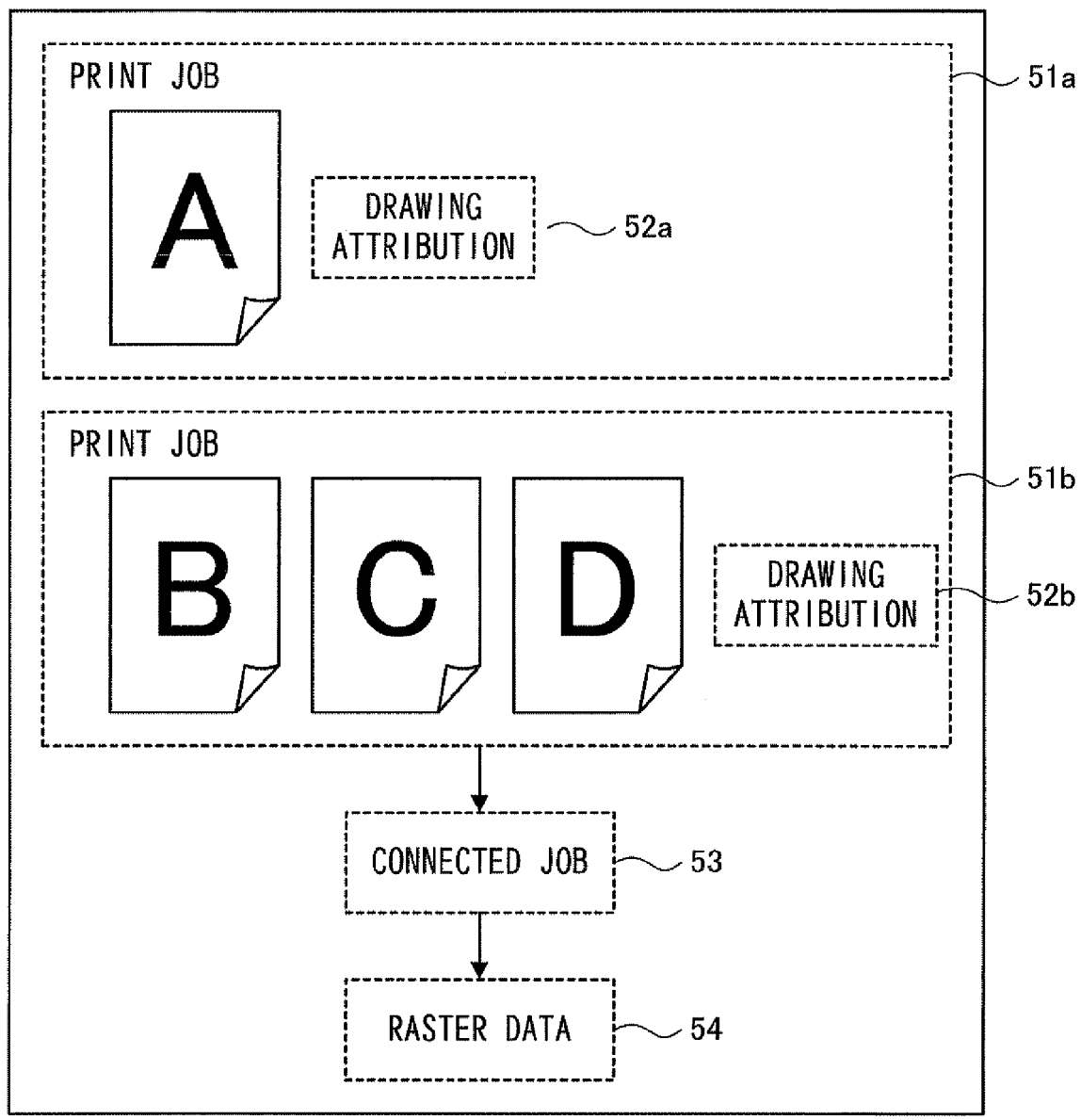
FIG. 2 is a diagram showing a process to connect two print jobs and to perform raster processing.

FIG. 2 is a diagram showing a process to connect two print jobs and to perform raster processing.

In FIG. 2, a drawing attribution 52a is set to a print job 51a, and a drawing attribution 52b is set to a print job 51b. The print jobs 51a and 51b are connected to generate a connected job 53, which is regarded as one print job. Thereafter, raster data 54 is generated by the raster processing on the basis of the connected job 53.

Figure 3:
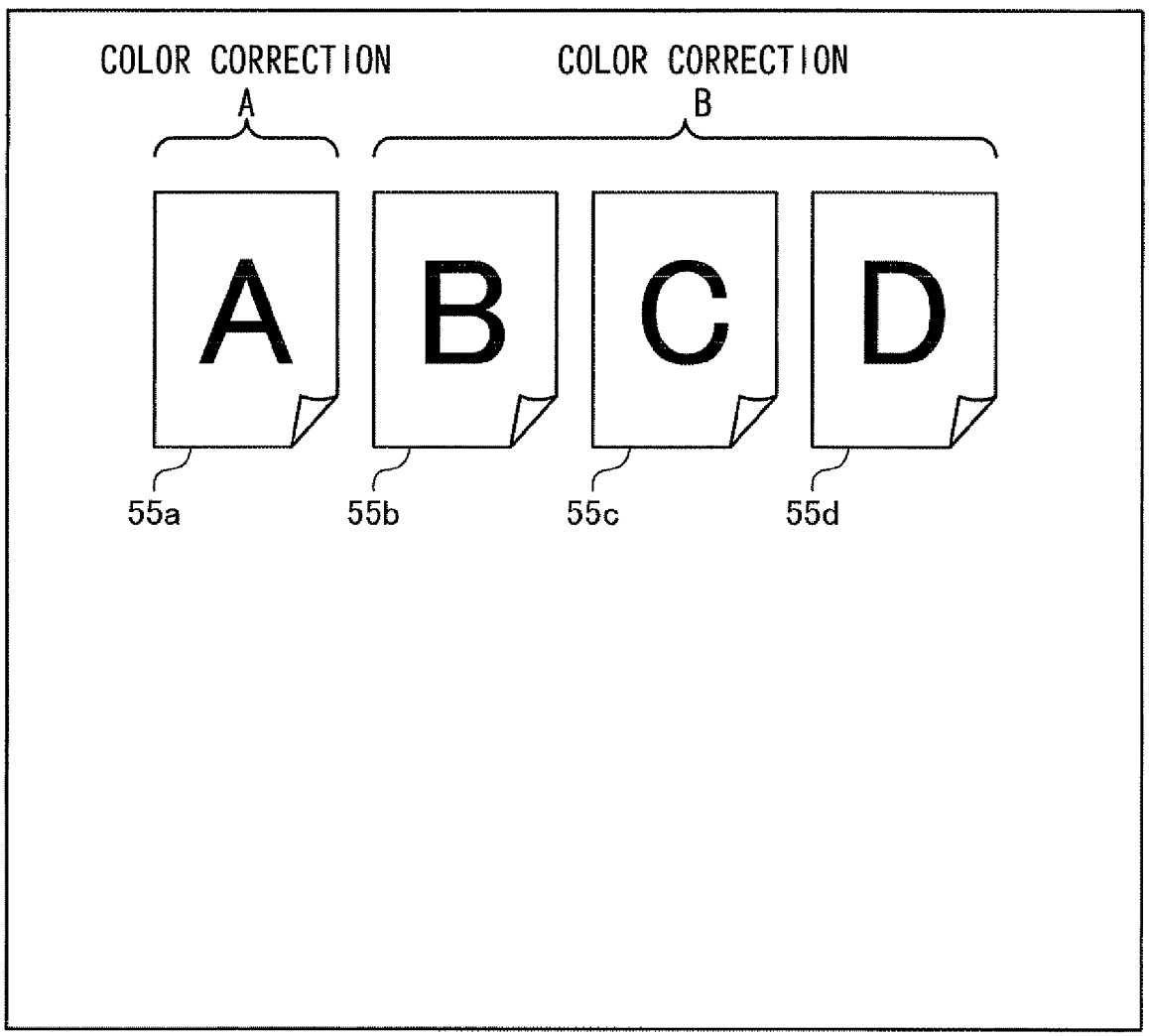
FIG. 3 is a diagram showing an example of thumbnail images displayed on the basis of the raster data.

FIG. 3 is a diagram showing an example of thumbnail images displayed on the basis of the raster data 54.

When thumbnail editing processing for editing by use of thumbnail images is started, the thumbnail images are displayed in a list format as an original preview that is a preview of original images, as shown in FIG. 3. Specifically, a thumbnail image 55a indicating an original image based on the print job 51a, and thumbnail images 55b, 55c and 55d indicating original images based on the print job 51b are displayed. Additionally, a color correction parameter A, as an example of the drawing attribution 52a set to the print job 51a, is associated with the thumbnail image 55a indicating the original image based on the print job 51a. A color correction parameter B, as an example of the drawing attribution 52b set to the print job 51b, is associated with the thumbnail images 55b, 55c and 55d indicating the original images based on, the print job 51b. The association is also shown in FIG. 3 (denoted by "color correction A" and "color correction B" in FIG. 3).

Figure 4:
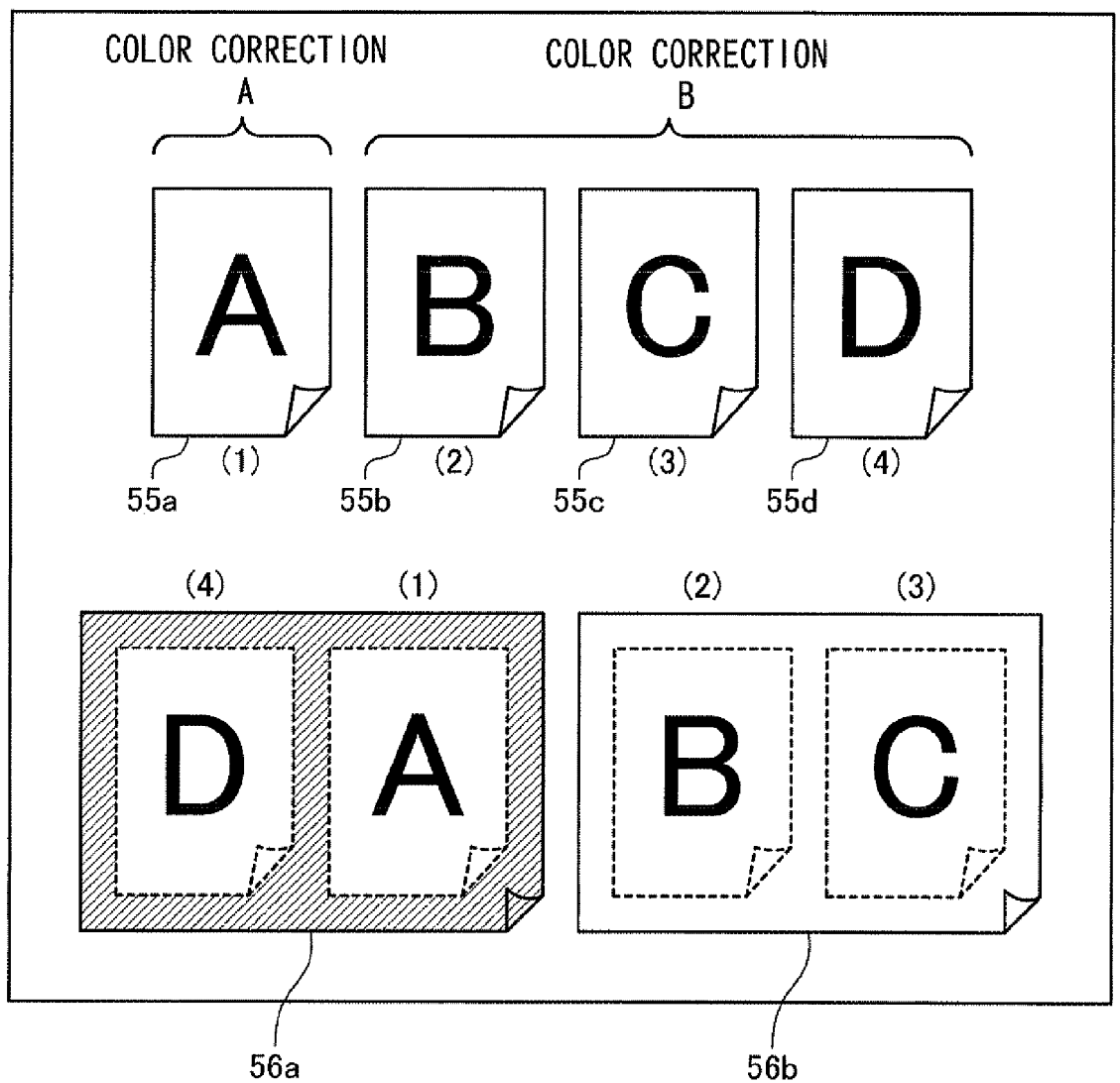
FIG. 4 is a diagram showing an example of thumbnail images displayed when imposition is performed.

FIG. 4 is a diagram showing an example of thumbnail images displayed when imposition is performed.

When imposition is performed, thumbnail images, as well as the original preview shown in FIG. 3, are displayed as an imposition preview that is a preview of a state in which the original images are imposed in one page of a sheet, as shown in FIG. 4. Specifically, a thumbnail image 56a indicating a page in which the thumbnail images 55d and 55a are imposed, and a thumbnail image 56b indicating a page in which the thumbnail images 55b and 55c are imposed are displayed. At this time, numbers indicating correspondence between the original images are displayed with the thumbnail images 55a to 55d displayed as the original preview and the original images in the thumbnail images 56a and 56b displayed as the imposition preview.

In such a state, it is determined whether the original images associated with different drawing attributions are arranged in one page of a sheet, on the basis of competing definition information (to be described later). In FIG. 4, the color correction parameter A is associated with the original image indicated by the thumbnail image 55a, while the color correction parameter B is associated with the original image indicated by the thumbnail image 55d. Thus, the original images with which competing drawing attributions are associated are arranged in the page indicated by the thumbnail image 56a. In such a case, according to a predetermined rule, the color correction parameters of these original images are adjusted to any one of the color correction parameters A and B, and a warning is then given. As the warning herein, for example, a message such as "Color correction is competing. Change color correction of imposition page 1?" may be displayed. In addition, the thumbnail image 56a indicating the page in which the original images associated with different drawing attributions are arranged is displayed in an aspect different from that of the thumbnail image indicating the other page. In FIG. 4, hatching with slanted lines shows that the thumbnail image 56a is displayed with a different color from that of the thumbnail image indicating the other page.

As described above, when the page in which the original images associated with different drawing attributions are arranged is found, a user performs an operation to address the problem of competing drawing attributions.

Figure 5:
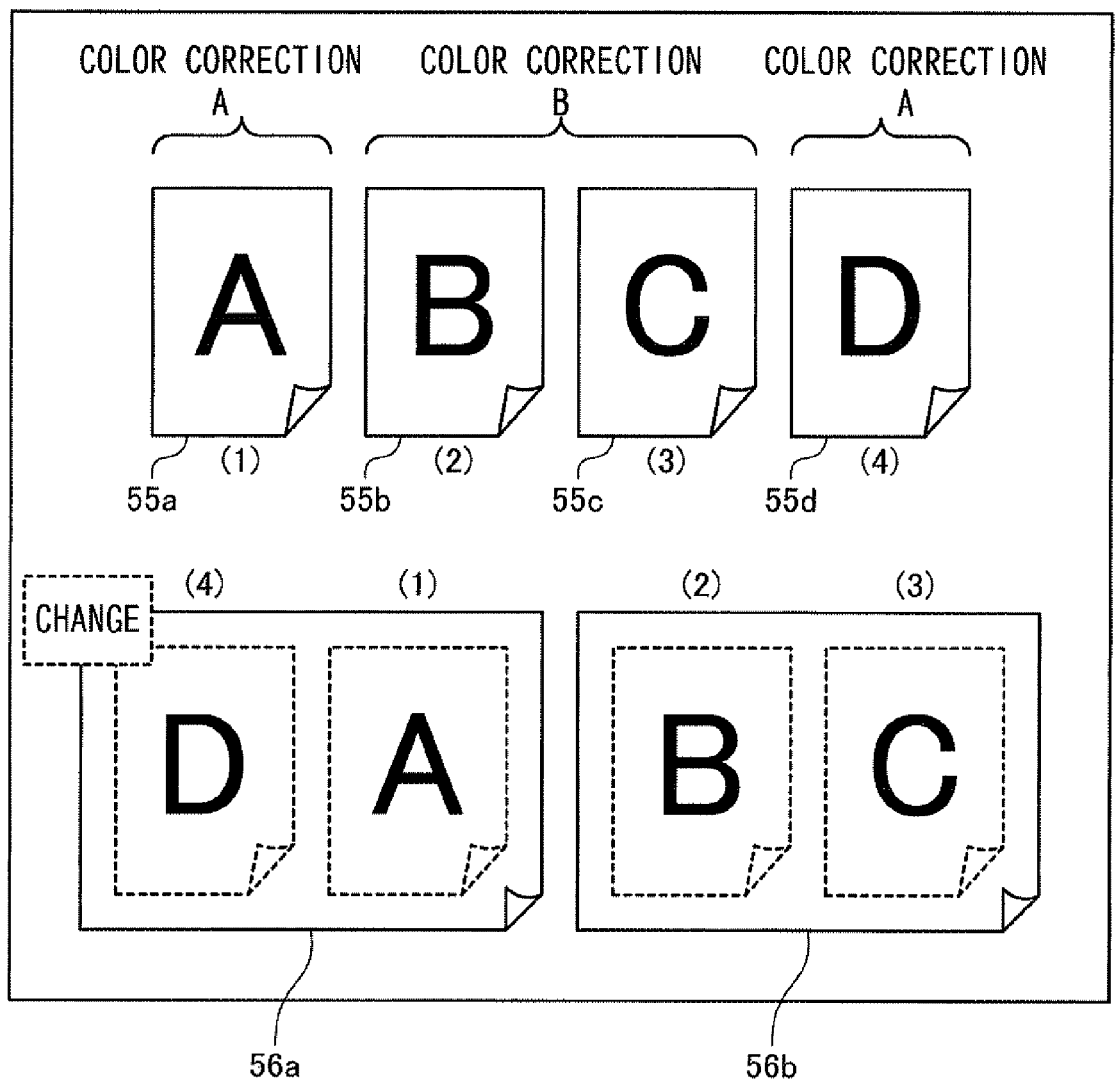
FIG. 5 is a diagram showing an example of thumbnail images when a user performs an operation to address the problem of competitive drawing attributions.

FIG. 5 is a diagram showing an example of thumbnail images when a user performs such an operation.

Firstly, the user selects the thumbnail image 56a displayed as an imposition preview indicating a state in which the original images associated with different color correction parameters are imposed. Then, drawing attribution changing processing is started, and processing to cause color correction parameters of plural original images imposed to the selected thumbnail image 56a to accord with each other is performed.

Examples of a method to cause color correction parameters to accord with each other are as follows.

Firstly, there is a method in which no color correction parameter is changed. This method employs the color correction parameter having been adjusted in FIG. 4.

Secondly, there is a method in which the color correction parameters are adjusted to any one of color correction parameters of the imposed original images. This method employs not the color correction parameter having been adjusted in FIG. 4 but a color correction parameter obtained by an adjustment method different from that in FIG. 4. For example, if the color correction parameter A is changed to be adjusted to the color correction parameter B in FIG. 4, the color correction parameter B is changed to be adjusted to the color correction parameter A by this method, conversely.

Thirdly, there is a method in which the color correction parameters are adjusted to a color correction parameter other than those of the imposed original images.

FIG. 5 shows that the color correction parameter B associated with the original image indicated by the thumbnail image 55d is changed to the color correction parameter A in order for the color correction parameters to accord with each other.

A description will be given of the competing definition information used for reference when it is determined whether original images associated with different drawing attributions are arranged in one page of a sheet, in FIG. 4.

Figure 6:
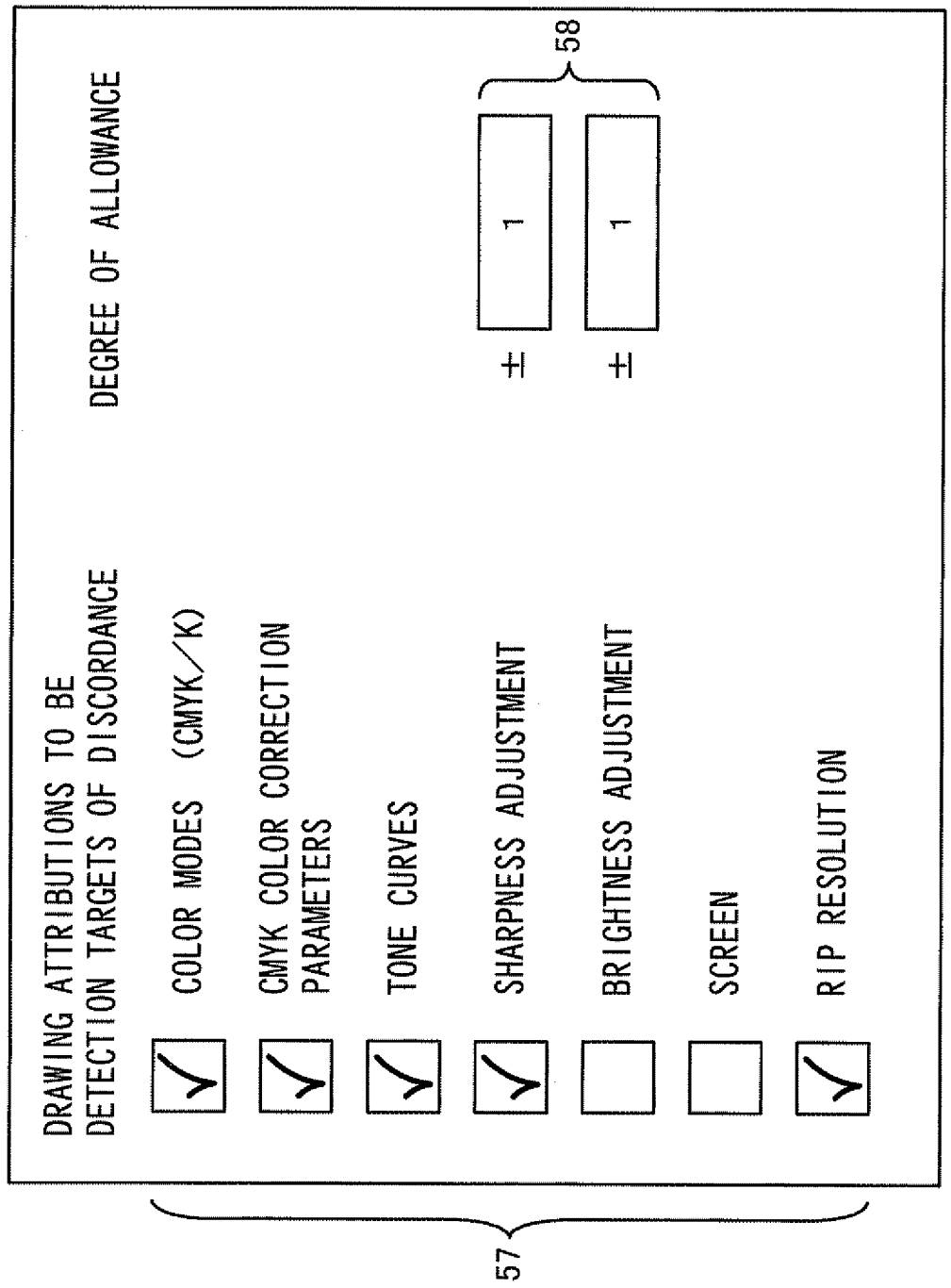
FIG. 6 is a diagram showing an example of a screen on the occasion of the registration of the competing definition information in the exemplary embodiment of the present invention.

FIG. 6 is a diagram showing a screen on the occasion of the setting of the competing definition information.

In the example of this screen, discordance between seven types of drawing attribution in total is allowed to be detected. However, a user has selected only five types of drawing attribution, namely, color modes, color correction parameters, tone curves, sharpness adjustment and Raster Image Processor (RIP) resolution, as detection targets of discordance by checking check boxes 57 corresponding to these types of drawing attribution. Meanwhile, accordance need not be strictly detected for some types of drawing attribution. In FIG. 6, the sharpness adjustment and brightness adjustment are shown as such types of drawing attribution. Degrees of allowance are allowed to be set in allowance setting sections 58 for these types of drawing attribution.

A drawing attribution such as a color mode, which is visually recognizable with a thumbnail image, may be excluded from the detection targets of discordance, and only visually unrecognizable drawing attributions may be included in the detection targets.

Next, a description will be given of the raster data managing unit 23 to realize such an operation.

Figure 7:
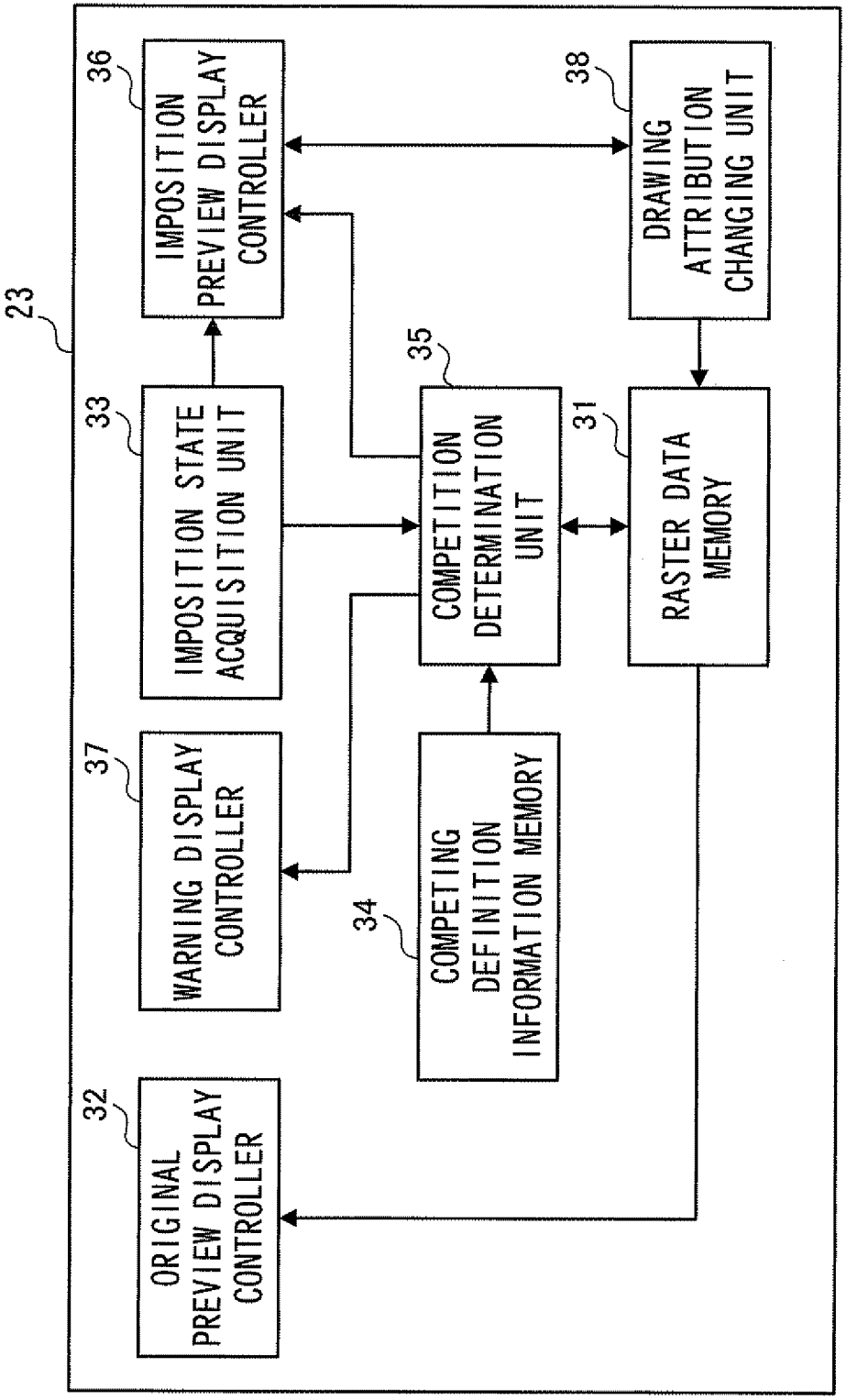
FIG. 7 is a block diagram showing an example of a functional configuration of the raster data managing unit according to the exemplary embodiment of the present invention.

FIG. 7 is a diagram showing an example of a functional configuration of the raster data managing unit 23.

As shown in FIG. 7, the raster data managing unit 23 includes a raster data memory 31, an original preview display controller 32, an imposition state acquisition unit 33, a competing definition information memory 34, a competition determination unit 35, an imposition preview display controller 36, a warning display controller 37 and a drawing attribution changing unit 38.

The raster data memory 31 stores therein the raster data generated by the rasterizing unit 22.

The original preview display controller 32 generates an original preview on the basis of the raster data stored in the raster data memory 31, and controls display of the original preview on a control panel, for example.

The imposition state acquisition unit 33 receives an instruction to impose plural original images in one page of a sheet, and acquires information on a state in which imposition is performed according to the instruction. In the present exemplary embodiment, the imposition state acquisition unit 33 is provided as an example of a receiving unit that receives an instruction to arrange a first image and a second image on one medium.

The competing definition information memory 34 stores therein the competing definition information as described in FIG. 6.

The competition determination unit 35 determines whether the drawing attributions associated with plural original images imposed in one page of a sheet are a type of drawing attribution defined in the competing definition information stored in the competing definition information memory 34 and differ from each other more than the degree of allowance also defined in the competing definition information. In the present exemplary embodiment, the competition determination unit 35 is provided as an example of a detection unit that detects a state in which plural images associated with drawing attributions different from each other are arranged on one virtual medium.

The imposition preview display controller 36 generates an imposition preview on the basis of information acquired by the imposition state acquisition unit 33 and a determination result obtained by the competition determination unit 35, and controls display of the imposition preview on the control panel, for example. In the present exemplary embodiment, the imposition preview is used as an example of a status image that indicates a state in which the first image and the second image are arranged on the one medium, and the imposition preview display controller 36 is provided as an example of a display controller that causes the status image to be displayed.

The warning display controller 37 generates a warning message on the basis of the determination result obtained by the competition determination unit 35, and controls display of the warning message on the control panel, for example. In the present exemplary embodiment, the warning display controller 37 is provided as an example of an output unit that outputs information indicating that at least one image is not formed on one real medium with a drawing attribution associated with the image, or an output unit that outputs information indicating that a first drawing attribution and a second drawing attribution compete with each other.

The drawing attribution changing unit 38 changes, by a method selected by a user, the drawing attributions associated with the raster data stored in the raster data memory 31, and changes the imposition previews displayed under control by the imposition preview display controller 36. In the present exemplary embodiment, the drawing attribution changing unit 38 is provided as an example of a changing unit that changes the drawing attributions.

Next, a description will be given of an operation of the raster data managing unit 23.

The operation of the raster data managing unit 23 includes the thumbnail editing processing as shown in FIGS. 3 and 4, and the drawing attribution changing processing as shown in FIG. 5, which will be separately described.

Figure 8:
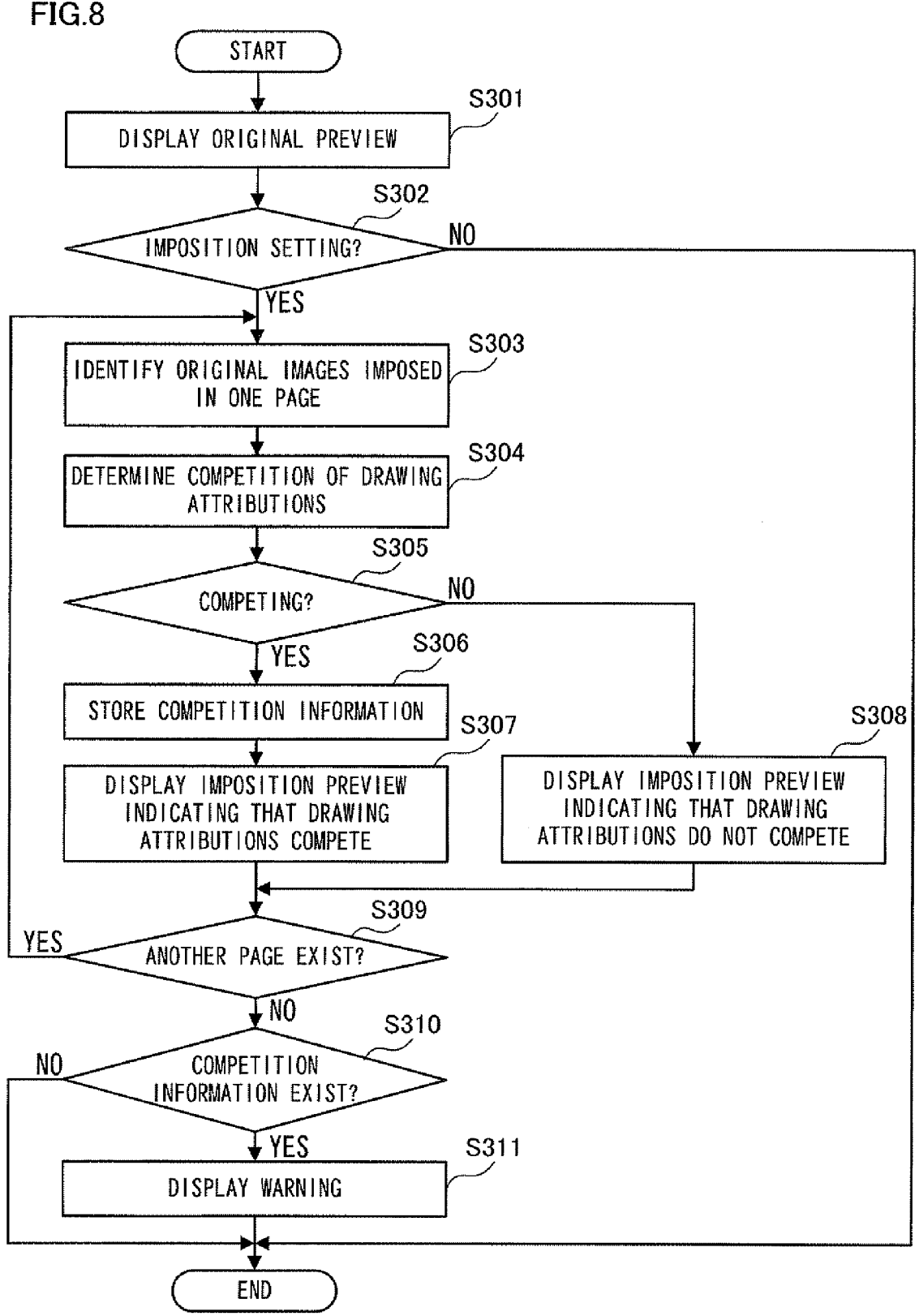
FIG. 8 is a flowchart showing an operation example of the thumbnail editing processing in the raster data managing unit according to the exemplary embodiment of the present invention.

FIG. 8 is a flowchart showing a flow of the thumbnail editing processing by the raster data managing unit 23.

In the raster data managing unit 23, when the thumbnail editing processing is started, the original preview display controller 32 first generates an original preview on the basis of the raster data stored in the raster data memory 31, and controls display of the original preview on the control panel, for example (Step 301). It is assumed that an original ID for uniquely identifying the original image being a source of the raster data is assigned to the raster data stored in the raster data memory 31, and that a thumbnail image displayed as an original preview is associated with the original ID assigned to the raster data being a source of the thumbnail image.

Next, the imposition state acquisition unit 33 determines whether the setting of the imposition is made (Step 302). If a user makes a setting of imposition, correspondence information between the page number of the page to be imposed and the original IDs of the original images imposed in the page is stored. Thus, whether the setting of imposition is made may be determined by confirming whether such correspondence information is stored.

If the setting of imposition is not made, the processing is finished. Meanwhile, if the setting of imposition is made, the imposition state acquisition unit 33 identifies plural original images imposed in one page (Step 303). This identification of the plural original images may be performed by use of the original IDs obtained by searching the above-mentioned correspondence information with the page number of the focused page used as a key.

The competition determination unit 35 then determines whether the drawing attributions associated with the identified original images are competing (Step 304). In this case, the determination as to whether there is competition is performed by checking the drawing attributions set to the raster data of the original IDs obtained in Step 303 among the raster data stored in the raster data memory 31. As to which type of drawing attribution is set as a target of the determination of competition of the drawing attributions, and as to how much difference in drawing attribution is enough to determine that the drawing attributions are competing, the criteria are determined on the basis of the competing definition information stored in the competing definition information memory 34.

As a result, if it is determined that the drawing attributions are competing (Yes in Step 305), the competition determination unit 35 first stores, to an unillustrated memory, competition information indicating the page number of the imposed page and the type of competing drawing attribution (Step 306). At this time, the competition determination unit 35 temporally changes the drawing attributions associated with the raster data stored in the raster data memory 31 so that the competing drawing attributions accord with any one of the drawing attributions. The imposition preview display controller 36 then generates an imposition preview indicating that the drawing attributions are competing, and controls display of the imposition preview on the control panel, for example (Step 307). In this case, it is assumed that the thumbnail images displayed as the imposition preview are associated with the page number of the page indicated by the thumbnail images and the original IDs of the original images imposed in the page.

On the other hand, if it is determined that the drawing attributions are not competing (No in Step 305), the imposition preview display controller 36 generates an imposition preview indicating that the drawing attributions are not competing, and controls display of the imposition preview on the control panel, for example (Step 308).

Thereafter, the imposition state acquisition unit 33 determines whether there is another imposed page (Step 309). If there is another imposed page, the processing in Steps 303 to 308 is repeated. If not, the processing proceeds to the next step.

Specifically, the competition determination unit 35 determines whether the competition information is stored in the unillustrated memory (Step 310). If the competition information is not stored in the memory, the processing is finished. Meanwhile, if the competition information is stored in the memory, the warning display controller 37 generates a message that shows the page number included in the competition information and the type of drawing attribution thereby to give a warning, and controls display of the message on the control panel, for example (Step 311).

Figure 9:
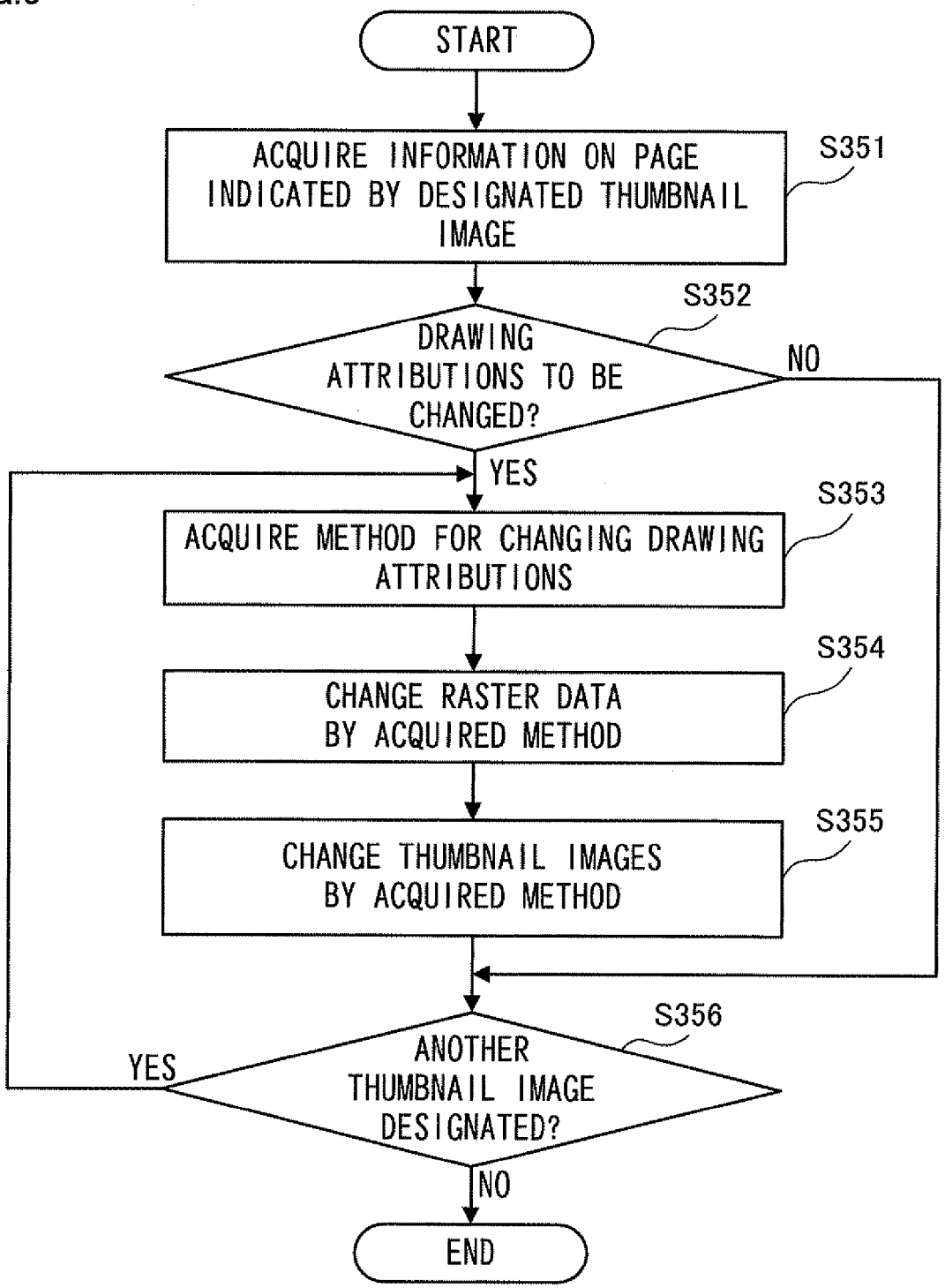
FIG. 9 is a flowchart showing an operation example of the drawing attribution changing processing in the raster data managing unit according to the exemplary embodiment of the present invention.

FIG. 9 is a flowchart showing a flow of the drawing attribution changing processing by the raster data managing unit 23.

In the raster data managing unit 23, when a thumbnail image indicating a state in which the original images having different drawing attributions are imposed in one page is designated and thereby the drawing attribution editing processing is started, the drawing attribution changing unit 38 first acquires, from the imposition preview display controller 36, the page number of the page indicated by the designated thumbnail image and the original IDs of the original images imposed in the page (Step 351).

Next, the drawing attribution changing unit 38 inquires of a user whether the drawing attributions are to be changed (Step 352).

As a result, if the user inputs a response indicating that the drawing attributions are not to be changed, the processing proceeds to Step 356.

On the other hand, if the user inputs a response indicating that the drawing attributions are to be changed, the drawing attribution changing unit 38 acquires a method, selected by the user, for changing the drawing attributions (Step 353). The drawing attribution changing unit 38 then changes, by the method acquired in Step 353, the drawing attributions associated with the raster data identified by the original IDs acquired in Step 351 (Step 354). The drawing attribution changing unit 38 also instructs the imposition preview display controller 36 to change the thumbnail image displayed as the imposition preview and indicating the imposed state to a thumbnail image indicating that the drawing attributions are not competing. The imposition preview display controller 36 then changes the thumbnail images (Step 355).

Thereafter, the drawing attribution changing unit 38 determines whether another thumbnail image indicating the imposed state is designated (Step 356). If another thumbnail image is designated, the processing in Steps 353 to 355 is repeated. If not, the processing is finished.

The description of the present exemplary embodiment is now finished.

In the present exemplary embodiment, if original images associated with different drawing attributions are arranged in one page of a sheet, the drawing attributions are changed to accord with each other and a warning is given. However, it is not necessarily limited to such a configuration. For example, an inquiry to the user for a changing method of the drawing attributions may be made without causing the drawing attributions to accord with each other, and then the drawing attributions may be caused to accord with each other by the changing method designated by the user.

Additionally, in the present exemplary embodiment, change of drawing attributions are performed on the drawing attributions associated with the raster data. However, it is not necessarily limited to such a configuration, either. For example, the drawing attributions posterior to changing may be set again to the print jobs prior to connecting or posterior to connecting, and then the raster data may be generated again.

The image processor 20 according to the present exemplary embodiment may be implemented not only in a printer but also in a generally used computer, such as a PC. However, since a printer driver is allowed to designate only a single drawing attribution, imposition by a printer driver does not cause the problem. Accordingly, when the image processor 20 according to the present exemplary embodiment is implemented in a generally used computer, the generally used computer is supposed to be a computer (print server or the like) that receives a print job from a printer driver to perform the processing.

Referring to such a generally used computer as a computer 90, a hardware configuration thereof will be described hereinafter.

Figure 10:
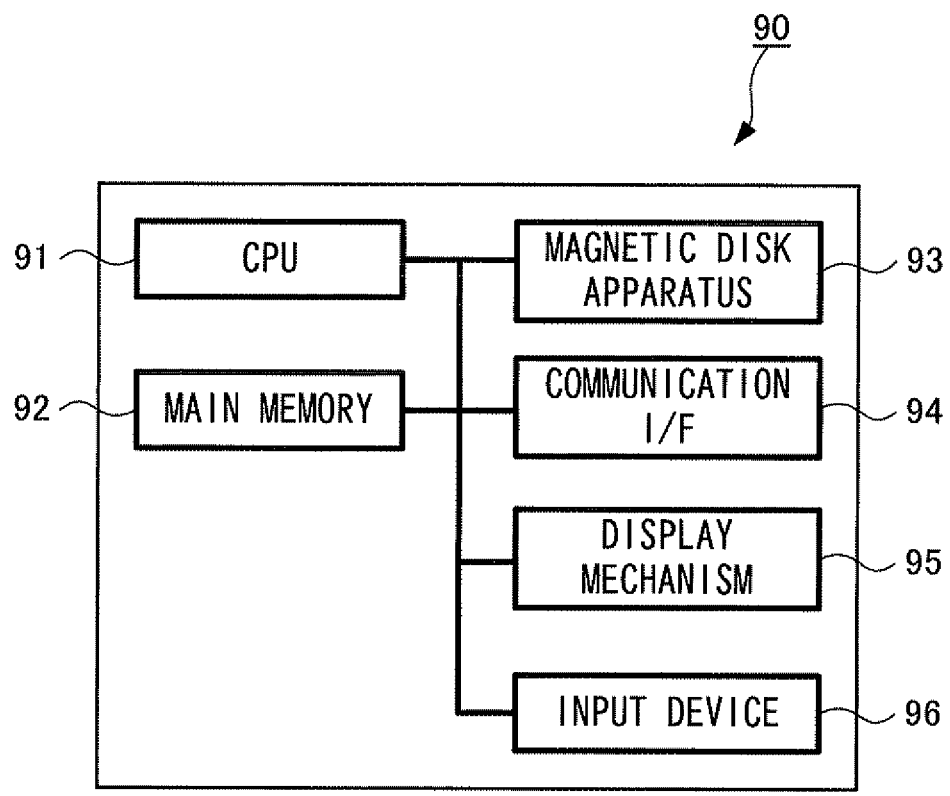
FIG. 10 is a diagram showing an example of a hardware configuration of a computer capable of implementing the exemplary embodiment of the present invention.

FIG. 10 is a diagram illustrating a hardware configuration of the computer 90.

As shown in FIG. 10, the computer 90 includes a central processing unit (CPU) 91, a main memory 92 and a magnetic disk apparatus (HDD: Hard Disk Drive) 93. Here, the CPU 91 executes operation system (OS) and various kinds of software such as application, and realizes various functions as described above. The main memory 92 is a memory area that stores various kinds of software, data used for executing the software and the like. The magnetic disk apparatus 93 is a memory area that stores input data to various kinds of software, output data from various kinds of software and the like.

Further, the computer 90 includes a communication I/F 94 that performs communication with external devices, a display mechanism 95 including a video memory, a display and the like, and an input device 96 such as a keyboard, a mouse or the like.

The program that achieves the present exemplary embodiments may be provided not only by a communication unit but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image arrangement supporting device comprising:
    a detection unit that detects a state in which a plurality of images associated with drawing attributions different from each other are arranged on one virtual medium,
    the detection unit further determining whether a drawing attribution associated with at least one of the plurality of images competes with a drawing attribution associated with another of the plurality of images; and
    an output unit that, based on the determination by the detection unit, outputs information indicating that the at least one of the plurality of images is not formed on one real medium with the drawing attribution associated with the at least one of the plurality of images.

2. The image arrangement supporting device according to claim 1, further comprising:
    a display controller that causes a status image to be displayed, the status image indicating the state in which the plurality of images are arranged on the one virtual medium; and
    a changing unit that changes at least one of a plurality of the drawing attributions respectively associated with the plurality of images so as to cause the plurality of drawing attributions to accord with each other, in response to an operation by a user designating the status image displayed by the display controller.

3. The image arrangement supporting device according to claim 1, wherein even if the plurality of drawing attributions respectively associated with the plurality of images are different from each other, the detection unit does not identify the plurality of drawing attributions as the drawing attributions different from each other if the plurality of drawing attributions are not drawing attributions of a type set in advance.

4. The image arrangement supporting device according to claim 1, wherein if a degree of difference in the plurality of drawing attributions respectively associated with the plurality of images does not exceed a degree set in advance, the detection unit does not identify the plurality of drawing attributions as the drawing attributions different from each other.

5. An image processor comprising:
    an acquisition unit that acquires a drawing command including a part to command drawing with a first drawing attribution and a part to command drawing with a second drawing attribution;
    a generation unit that generates a first image associated with the first drawing attribution and a second image associated with the second drawing attribution, on the basis of the drawing command acquired by the acquisition unit;
    a receiving unit that receives an instruction to arrange the first image and the second image on one medium; and
    an output unit that outputs information indicating that the first drawing attribution and the second drawing attribution compete with each other, if the first drawing attribution and the second drawing attribution are different from each other when the receiving unit receives the instruction.

6. The image processor according to claim 5, further comprising:
    a display controller that causes a status image to be displayed, the status image indicating a state in which the first image and the second image are arranged on the one medium; and a changing unit that changes at least one of the first drawing attribution and the second drawing attribution so as to cause the first drawing attribution and the second drawing attribution to accord with each other, in response to an operation by a user designating the status image displayed by the display controller; and a drawing unit that draws the first image with the first drawing attribution and the second image with the second drawing attribution after the changing unit changes at least one of the first drawing attribution and the second drawing attribution.

7. The image processor according to claim 5, wherein the output unit outputs the information indicating that the first drawing attribution and the second drawing attribution compete with each other, if the first drawing attribution and the second drawing attribution are different from each other and are drawing attributions of a type set in advance when the receiving unit receives the instruction.

8. The image processor according to claim 5, wherein the output unit outputs the information indicating that the first drawing attribution and the second drawing attribution compete with each other, if a degree of difference between the first drawing attribution and the second drawing attribution exceeds a degree set in advance when the receiving unit receives the instruction.

9. An image arrangement supporting method comprising:

detecting a state in which a plurality of images associated with drawing attributions different from each other are arranged on one virtual medium, determining whether a drawing attribution associated with at least one of the plurality of images competes with a drawing attribution associated with another of the plurality of images; and based on the determination, outputting information indicating that the at least one of the plurality of images is not formed on one real medium with the drawing attribution associated with the at least one of the plurality of images.

10. A non-transitory computer readable medium storing a program that causes a computer to execute a process for image arrangement, the process comprising:

detecting a state in which a plurality of images associated with drawing attributions different from each other are arranged on one virtual medium, determining whether a drawing attribution associated with at least one of the plurality of images competes with a drawing attribution associated with another of the plurality of images; and based on the determination, outputting information indicating that the at least one of the plurality of images is not formed on one real medium with the drawing attribution associated with the at least one of the plurality of images.

* * * * *